United States Patent [19]

van der Lely

[11] 4,224,999

[45] Sep. 30, 1980

[54] SOIL CULTIVATING IMPLEMENTS

[76] Inventor: Cornelis van der Lely, 7, Brüschenrain, Zug, Switzerland

[21] Appl. No.: 881,142

[22] Filed: Feb. 24, 1978

[30] Foreign Application Priority Data

Mar. 2, 1977 [NL] Netherlands ............... 7702206

[51] Int. Cl.³ ............................................. A01B 33/06
[52] U.S. Cl. ................................... 172/59; 172/91
[58] Field of Search ............... 172/59, 111, 523, 526, 172/713, 49, 91

[56] References Cited

U.S. PATENT DOCUMENTS

| 661,309 | 11/1900 | Darby | 172/59 |
| 1,697,677 | 1/1929 | Davidson | 172/59 |
| 4,044,839 | 8/1977 | van der Lely | 172/111 |
| 4,111,264 | 9/1978 | van der Lely | 172/59 |

FOREIGN PATENT DOCUMENTS

| 2124135 | 9/1972 | France | 172/123 |
| 2274207 | 1/1976 | France | 172/59 |
| 7412331 | 3/1976 | Netherlands | 172/59 |
| 7509995 | 3/1977 | Netherlands | 172/59 |

Primary Examiner—Richard J. Johnson
Attorney, Agent, or Firm—Mason, Mason and Albright

[57] ABSTRACT

An implement has rotatable cultivating members that are driven to rotate about upwardly extending axes. Each member includes a horizontal support arm and downwardly extending tools journalled at each end of the arm for free rotation. Along the length of each tool, are radial, superposed soil-working elements that are flat; the lowermost element can have cutting edges. The elements are separated from one another by spacer sleeves and are angularly offset relative to one another. Also, the elements can be different in configuration from one another and in one version, the tools are rotatable about axes that converge towards the axis of rotation of the corresponding member. When rotated and moved through the soil, the elements work ground at different levels to intermix the soil.

6 Claims, 6 Drawing Figures

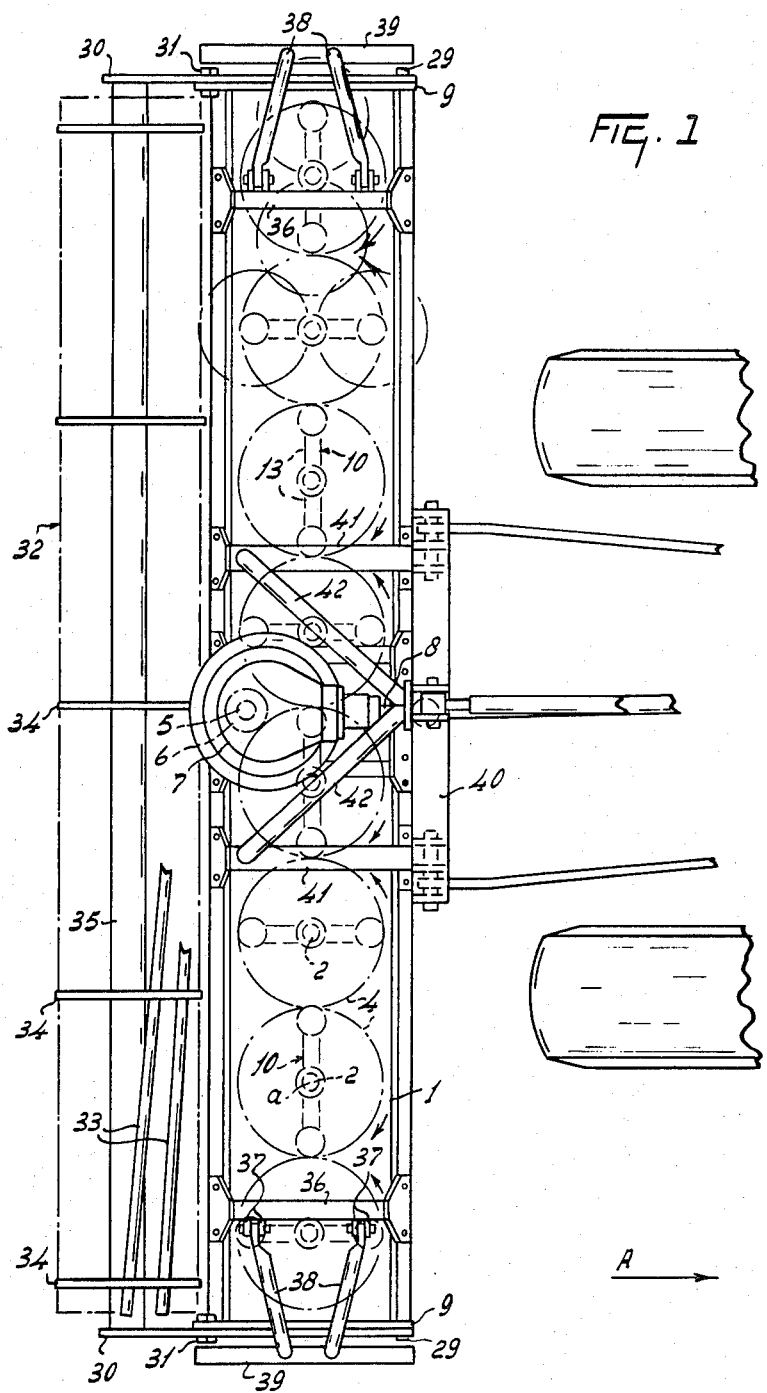

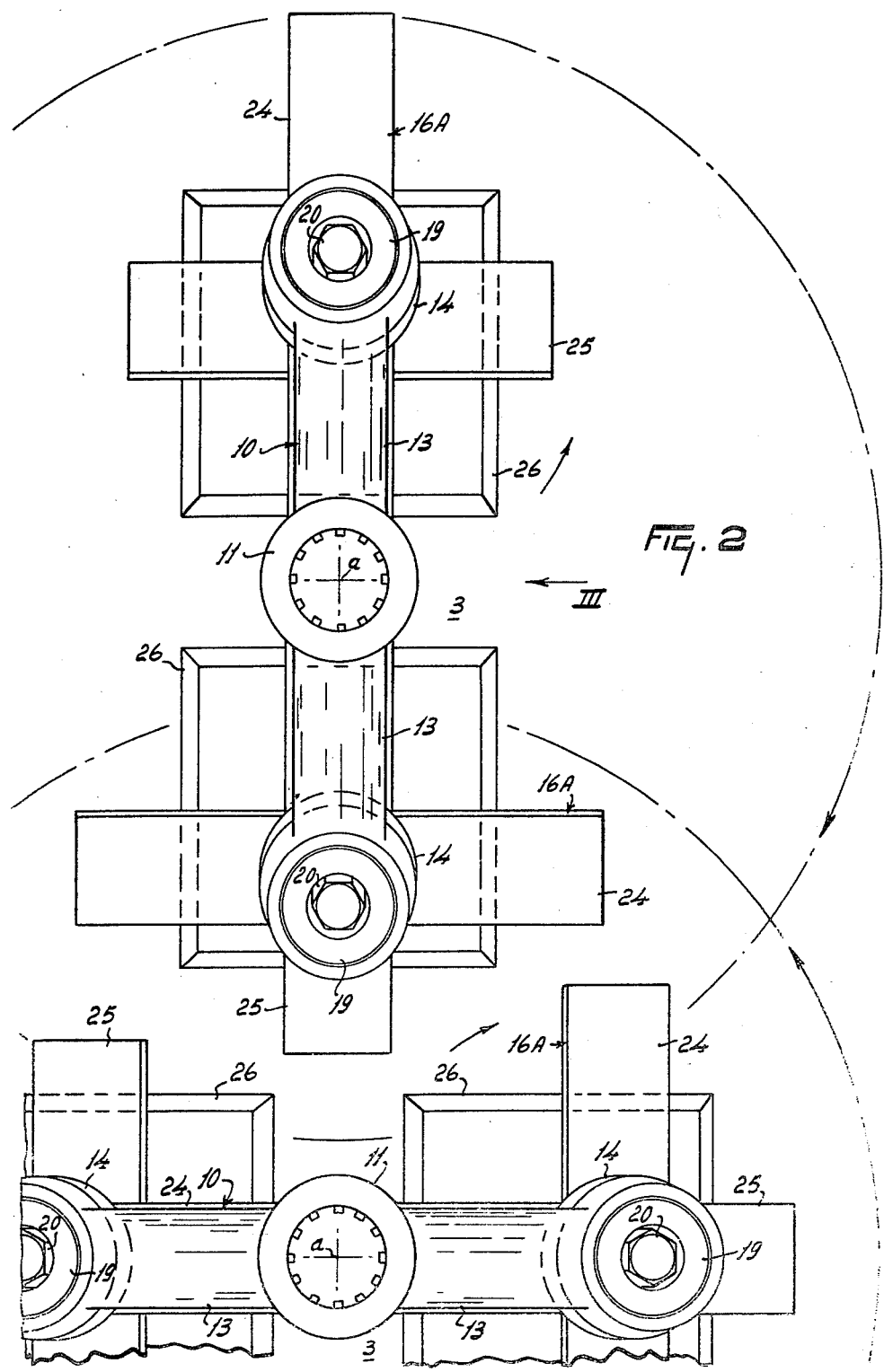

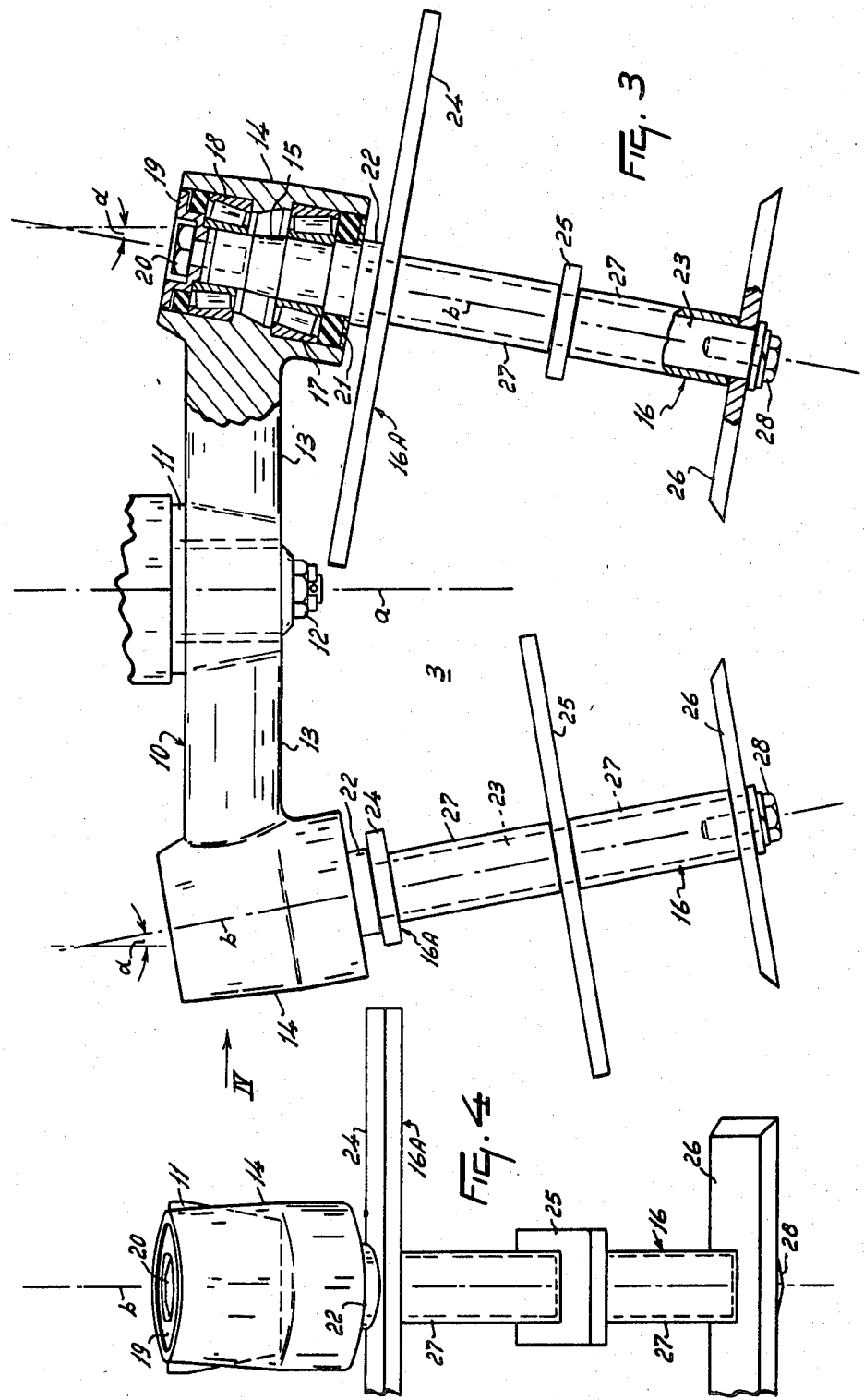

SOIL CULTIVATING IMPLEMENTS

According to one aspect of the invention, there is provided a soil cultivating implement of the kind set forth, wherein the or each rotatable cultivating tool comprises at least one elongate soil working element which projects in two non-vertical directions from the axis of rotation of that tool.

Figure 5:
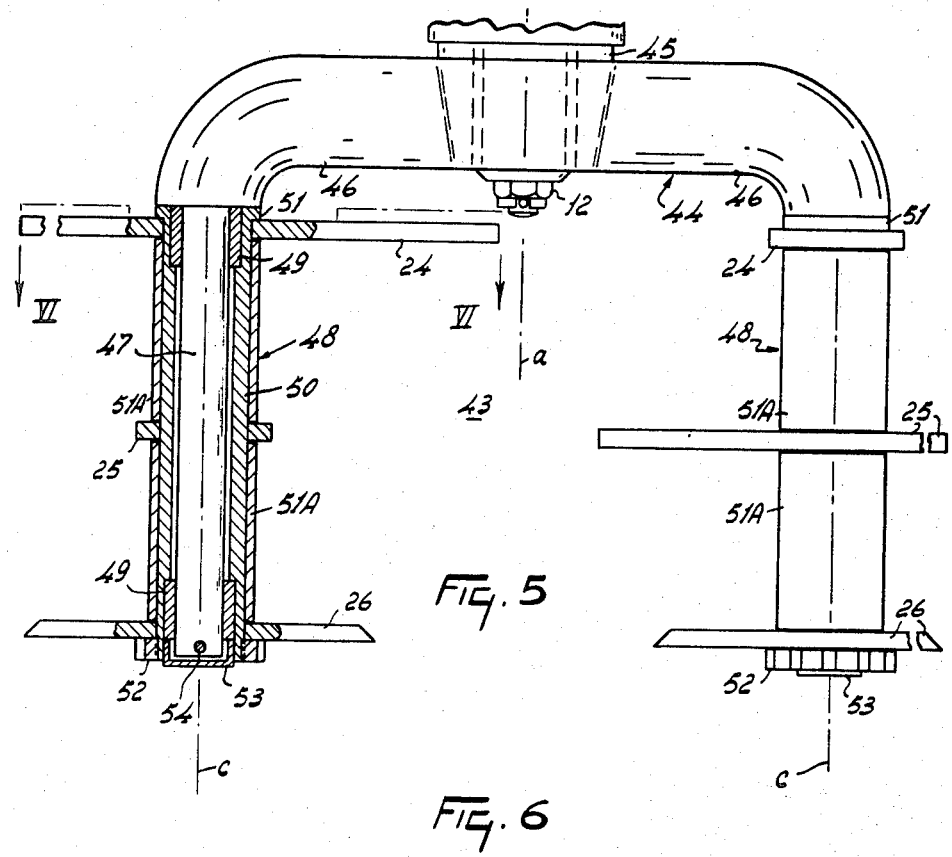
Figure 6:
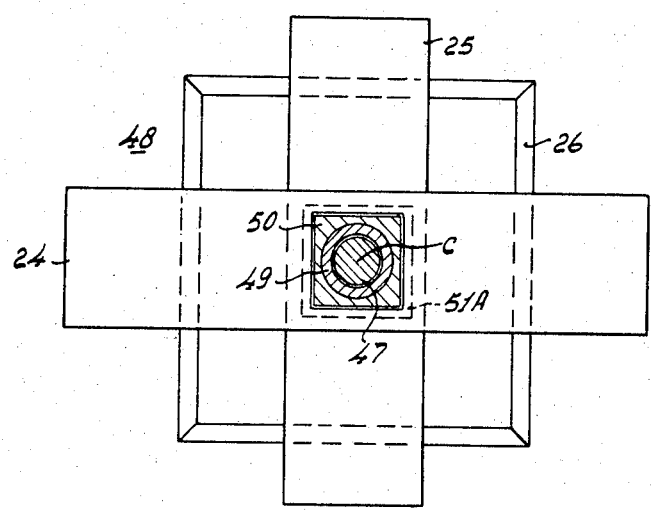

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a plan view, to an enlarged scale, illustrating the construction and arrangement of two neighbouring soil working members of the implement of FIG. 1, FIG. 3 is a part-sectional elevation as seen in the direction indicated by an arrow III in FIG. 2, FIG. 4 is an elevation as seen in the direction indicated by an arrow IV in FIG. 3, FIG. 5 is again a part-sectional elevation as seen in the direction indicated by an arrow III in FIG. 2 but illustrates an alternative embodiment, and FIG. 6 is a section taken on the line VI—VI in FIG. 5.

Referring to FIGS. 1 to 4 of the accompanying drawings, the soil cultivating implement which is illustrated therein has a frame which comprises a hollow box-section frame portion 1 that extends substantially horizontally transverse, and usually (as illustrated) substantially perpendicular, to the intended direction of operative travel of the implement which is indicated in FIG. 1 by an arrow A. A plurality of substantially vertical, or at least upwardly extending, shafts 2 are rotatably mounted in the hollow frame portion 1 and are arranged in a single row with their axes of rotation spaced apart from one another at regular intervals which advantageously, but not essentially, have magnitudes of substantially 375 millimeters. There are eight of the shafts 2 in the embodiment which is being described but it is emphasised that there could be a greater or lesser number thereof. The lowermost end of each shaft 2 projects downwardly from beneath the hollow frame portion 1 and is there provided with a corresponding soil working member 3 whose construction and arrangement will be further described below. Each shaft 2 is provided, inside the hollow frame portion 1 with a corresponding straight-toothed or spurtoothed pinion 4, the size and arrangement of the pinions 4 being such that the teeth of each of them are in mesh with those of the or each immediately neighbouring pinion 4 in the row of eight such pinions. A shaft 5 that is in substantially vertically parallel relationship with the shafts 2 is provided at substantially the rear of the hollow frame portion 1, with respect to the direction A, and substantially midway across the width of the frame portion 1 in a direction that is perpendicular to the direction A. The shaft 5 has a portion that is located inside the hollow frame portion 1 and also a portion which projects above the top of the latter. The shaft 5 carries, inside the hollow frame portion 1, a pinion 6 whose teeth are in driving mesh with those of one of the center pair of larger pinions 4 in the single row of those pinions. The portion of the shaft 5 that extends above the top of the hollow frame portion 1 projects into a gear box that is secured in positon on top of the frame portion 1 substantially midway across the width thereof. A bevel pinion (not illustrated) on the portion of the shaft 5 that is located inside the gear box 7 is in driven mesh with a further bevel pinion (also not shown) carried by a substantially horizontally disposed rotary input shaft 8 of the gear box 7 which shaft 8 has a splined or otherwise keyed portion which projects forwardly from the front of the gear box 7 in substantially the direction A. The forwardly projecting splined or otherwise keyed portion of the rotary input shaft 8 is intended to be placed in driven connection with the rear power take-off shaft on an agricultural tractor or other operating vehicle of the implement by way of an intermediate telescopic transmission shaft, that is of a construction which is known per se, having universal joints at its opposite ends. Part of such a transmission shaft is illustrated somewhat diagrammatically in FIG. 1 of the drawings. The opposite ends of the hollow box-section frame portion 1 are closed by side plates 9 that are substantially vertically parallel to one another and parallel or substantially parallel to the direction A.

Each of the soil working members 3 comprises a substantially horizontally disposed support or carrier 10 which has central internally splined hub 11 whose splines co-operate with matching external splines on the portion of the associated shaft 2 which projects downwardly from beneath the bottom of the hollow frame portion 1. Moreover, each shaft 2 has a lowermost screwthreaded end part of reduced diameter which end part receives a washer and a co-operating fastening nut 12 which, when tightened, prevents the soil working member 3 concerned from becoming detached from its driving shaft 2. Each nut 12 is preferably provided, as diagrammatically illustrated in FIG. 3, with a split pin or other means which is designed to prevent it from working loose when the implement is in use. The support or carrier 10 of each soil working member 3 comprises two arms 13 which are both straight and of equal lengths, said arms 13 projecting from diametrically opposite sides of the corresponding hub 11. The two arms 13 of each support or carrier 10 extend radially with respect to the longitudinal axis/axis of rotation of the corresponding shaft 2, such axes being denoted by the reference a in the drawings. The outer ends of the two arms 13 of each pair either integrally (as illustrated) or at least rigidly carry corresponding substantially cylindrical sleeve-like holders 14, the longitudinal axes b of the two holders 14 of each soil working member 3 being coplanar with the corresponding axis of rotation a but, as will be evident from FIG. 3 of the drawings, being in non-parallel relationship with that axis a. The stepped interior of each sleeve-like holder 14 rotatably receives the also stepped upper end 15 of a corresponding straight shaft 16 which projects obliquely downwardly from the lowermost end of the holder 14 concerned. Each freely rotatable shaft 16 is so disposed that its longitudinal axis is coincident with the longitudinal axis b of the holder 14 in whose interior the upper end 15 of that shaft is rotatably received. FIG. 3 of the drawings shows that, in the plane which contains the axis of rotation a and the corresponding two axes b for each soil working member 3, each axis b is inclined to a line which is parallel to the corresponding axis a at an angle $\alpha$ that advantageously has a magnitude of substantially 10°. The two shafts 16 of each pair are downwardly convergent towards one another so that their upper ends 15 are further spaced apart from one another than are their lower ends. It will be apparent from FIG. 3 of the drawings that, due to the coplanar relationship of each axis of rotation a and the corresponding pair of axes b, there will be a point, for each soil working member 3, where the three axes a and b concerned all intersect.

The upper end 15 of each shaft 16, which upper end 15 is in the nature of a stub shaft, is rotatably received in the corresponding holder 14 by opposed and relatively spaced lower and upper tapered roller bearings 17 and 18 that are of different diameters, the lower bearing 17 of each pair 17/18 being the bearing which is of larger diameter. The inner race of each lower bearing 17 abuts, at its lower end, against a step or shoulder of the corresponding upper shaft end 15 whereas the lower end of the outer race of the corresponding upper bearing 18 abuts against an internal step or shoulder of the surrounding holder 14. The upper end of each holder 14 is closed by a corresponding cover or cap 19 whose recessed center is releasably secured to the upper extremity of the upper shaft end 15 concerned by the head of a bolt 20 whose shank is screwed axially into said upper end 15. The recess in the top of each cover or cap 19 completely receives the head of the corresponding bolt 20 so that said head does not project above the cover or cap. It will be seen from FIG. 3 of the drawings that a rotary seal is provided between a convex cylindrical wall of each cover or cap 19 and the surrounding concave cylindrical wall of the respective holder 14. The bottom of each holder 14 is closed by an annular ring 21 whose inner edge region abuts against an underlying step or shoulder 22 of the upper shaft end 15 concerned. It will also be seen in FIG. 3 of the drawings that a second lower rotary seal is provided immediately above each ring 21 so as to extend between that ring and the lower end of the corresponding lower tapered roller bearing 17. The step or shoulder 22 of each shaft 16 constitutes a boundary between the upper end 15 of that shaft and a lower portion 23 thereof which latter portion is provided with a plurality of soil working elements of which, in the embodiment that is being described, there are three elements 24, 25 and 26 per shaft portion 23. The portion 23 of each shaft 16 has a polygonal cross-section which advantageously, as illustrated, is a square one. The elements 24, 25 and 26 are spaced apart from one another along the shaft portion 23 concerned and both the upper element 24 and the central element 25 are of straight strip-shaped configuration, the strip material from which they are made having a width of substantially 60 millimeters and a thickness of substantially 10 millimeters, both elements 24 and 25 being disposed perpendicular or substantially perpendicular to the corresponding axis b. The uppermost element 24 of each goup of three has a length which may advantageously be substantially 300 millimeters and said length is greater than that of the underlying central element 25 which latter, in the embodiment that is being described, has a length of substantially 240 millimeters. The lowermost element 26 of each group of three elements is of polygonal configuration and is advantageously, as illustrated, square or substantially square, each edge of the square having a length of substantially 180 millimeters and being bevelled so as to constitute a cutting edge. The general plane of each lower element 26 is also perpendicular of substantially perpendicular to the corresponding axis b and said element 26 is formed from material of substantially the same thickness as that which is employed for the companion elements 24 and 25, i.e., a material having a thickness of substantially 10 millimeters. Each of the elements 24 and 25 is formed, midway along its length, with a hole and each lower element 26 is similarly formed with a central hole, said holes matching the polygonal configuration of the shaft portion 23 with which they are to co-operate and thus, in this embodiment, all being square in shape. The elements 24, 25 and 26 are slid onto the corresponding shaft portion 23 from its lower end and are kept in their appointed spaced apart relationship by spacing sleeves 27 whose cross-sectional shapes match those of the shaft portion 23. The sleeves 27 which extend between the upper and central elements 24 and 25 perferably have the same axial lengths as do the sleeves which between the central and lower elements 25 and 26. Bolts 28 have their shanks screwed axially into the lower ends of the shaft portions 23 and the heads of said bolts 28 co-operate with washers in clamping the groups of elements 24, 25 and 26, and the intervening spacing sleeves 27, between those heads and the steps or shoulders 22 of the shaft 16 concerned. It can be seen in FIGS. 2 to 4 of the drawings that the central element 25 of each group is arranged to project from opposite sides of the corresponding axis b in directions which are perpendicular, or substantially perpendicular, to the directions in which the associated upper element 24 projects from the same axis b. Due to the inclinations α of the axes b to lines which are parallel to the usually substantially vertical axes of rotation a, the upper and lower flat surfaces of the elements 24, 25 and 26 are all significantly inclined to the horizontal and the flat outer surfaces of the polygonal spacing sleeves 27 are all significantly inclined to the vertical.

The fronts of the two frame portion side plates 9, with respect to the direction A, are provided with substantially horizontally aligned stub shafts 29 and corresponding arms 30, which extend rearwardly from said stub shafts 29 with respect to the direction A, are turnable upwardly and downwardly about said stub shafts 29 alongside the respective plates 9. Rear edge regions, with respect to the direction A, of the side plates 9 that project behind the remainder of the hollow frame portion 1 are formed with curved rows of holes at the same distances from the substantially horizontal axis which is defined by the stub shafts 29. The arms 30 are formed with holes at the same distance from said axis and bolts 31 are provided for entry through the holes in the arms 30 and chosen of the curved rows of holes in the side plates 9 so that, when tightened, said bolts 31 will retain the arms 30 firmly but releasably in chosen angular positions about the axis which is defined by the substantially horizontally aligned stub shafts 29. The arms 30 project rearwardly behind the side plates 9 with respect to the direction A and their rearmost ends have an open-work cage formation ground roller 32 mounted between them in a freely rotatable manner so that said roller 32 extends throughout the combined working width of the eight soil working members 3. The roller 32 has a central, preferably tubular, axially extending carrier 35 and a plurality, such as five, of support plates 34 are secured to said carrier 35 at regularly spaced apart intervals along the length thereof, two of said plates 34 being located close to the opposite ends of the carrier 35. The support plates 34 are of substantially circular configuration and are in parallel substantially vertically disposed relationship with one another and parallel or substantially parallel relationship with the direction A. Each support plate 34 is formed at regular intervals around its periphery with a plurality of holes and elongate elements 33 of rodshaped or tubular formation are entered lengthwise through said holes in the successive plates 34 so as to extend helically around the central carrier 35 to some extent and so as to form the skeletal ground-engaging cylindrically curved surface of the roller 32.

Two supports 36 that both extend substantially horizontally parallel to the direction A are arranged on top of the hollow frame portion 1 at short distance inwardly from the opposite ends of that frame portion. That side of each support 36 which faces towards the adjacent end of the frame portion 1 is provided with two pairs of projecting lugs 37, said pairs of lugs 37 being spaced apart from one another along the length of the support 36 concerned. The two pairs of lugs 37 that correspond to each support 36 carry aligned pivot pins which define an axis that is substantially horizontally parallel to the direction A and the ends of two arms 38 are mounted on said pivot pins, in a freely turnable manner, between the lugs 37 of the two pairs. The two arms 38 that correspond to each support 36 extend, in convergent relationship, towards, and over, the adjacent end of the hollow frame portion 1 where they are both bent over downwardly to be secured to a corresponding shield plate 39 which will usually be substantially vertically disposed in parallel or substantially parallel relationship with the direction A. The lower edges of the two shield plates 39 are shaped to make sliding progress over the soil in the direction A during the operation of the implement and in the reverse direction during manoeuvring and it will be apparent that both shield plates 39 are turnable upwardly and downwardly about the axes that are defined by the corresponding pivot pins which connect the arms 38 to the pairs of lugs 37 so that said shield plates can match undulations in the surface of the soil over which the implement travels in the use thereof. The shield plates 39 co-operate with the soil working members 3 at the opposite ends of the row of those soil working members in ensuring that the soil is worked by the implement to substantially the same intensity as occurs at locations which are further from the edges of the path of operation thereof. Moreover, the shield plates substantially prevent stones and like hard objects from being flung laterally of the path of travel of the implement when it is in use thus very greatly reducing the danger of injury or damage to bystanders, property and so on. The front of the hollow frame portion 1, with respect to the direction A, is provided, midway between the general planes of the two side plates 9, with a coupling member or trestle 40 which is of substantially triangular configuration as seen in front or rear elevation. Lower parts of the coupling member or trestle 40 are secured to the leading ends of two further support 41 which, like the supports 36, extend substantially parallel to the direction A at two locations on top of the hollow frame portion 1 which locations are spaced by equal distances from the midpoint of said frame portion. A location at substantially the apex of the generally triangular coupling member or trestle 40 is connected by two downwardly and rearwardly divergent strengthening tie beams 42 to points which are on top of the two further supports 41 and close to the rearmost ends of those supports 41 with respect to the direction A. The coupling member or trestle 40 is constructed and arranged for connection to the free ends of the lifting links of a three-point lifting device or hitch at the rear of an agricultural tractor or other operating vehicle of the implement, such form of connection being well known per se and being illustrated only diagrammatically in FIG. 1 of the drawings.

In the use of the soil cultivating implement that has been described with reference to FIGS. 1 to 4 of the drawings, its coupling member or trestle 40 is connected to the three-point lifting device or hitch at the rear of an agricultural tractor or other operating vehicle and the rear power take-off shaft of the same tractor or other vehicle is placed in driving connection with the forwardly projecting splined or otherwise keyed end of the rotary input shaft 8 of the gear box 7 by way of the previously mentioned known telescopic transmission shaft that has universal joints at its opposite ends. Adjustments that may need to be made, before work commences, include setting the maximum depth to which the soil working members 3 of the implement will be able to penetrate into the ground by moving the freely rotatable roller 32 bodily upwards, or downwards, relative to the hollow frame portion 1 by turning the arms 30 about the axis which is defined by the stub shafts 29 in the manner previously described, using the bolts 31 to maintain any newly chosen level of the roller 32 relative to the frame portion 1 for as long as may be required. As the implement makes operative progress in the direction A, it is partially supported from the ground by the roller 32 which thus functions as a rotatable supporting member of the implement. Due to the intermeshing relationship of the pinions 4 inside the hollow frame portion 1, those pinions 4, together with the corresponding shafts 2 and soil working members 3, will be rotated about the respective axes a in the directions which are indicated by small arrows in FIG. 1 of the drawings and by arrows at the right-hand side of FIG. 2. Thus, each soil working member 3 is positively rotated in a direction which is opposite to that of its neighbour, or to those of both of its neighbours, in the single row of eight such members 3. It will be evident from the upper part of FIG. 1 of the drawings and from FIG. 2 thereof that the strips of soil which are worked by the individual members 3 considerably overlap one another so as, in effect, to cultivate a single broad strip of land which, in the embodiment that has been described where the eight axes of rotation a are spaced apart from one another by distances of substantially 375 millimeters, will have a width of substantially 3 meters. The drive which is applied to the shaft 8 is, of course, transmitted to the pinions 4 by way of the bevel pinions (not illustrated) inside the gear box 7, the shaft 5 and the pinion 6. Each assembly which comprises a group of three soil working elements 24, 25 and 26, together with the intervening spacing sleeves 27, may be considered as affording a cultivating tool which is generally indicated in the drawings by the reference 16A. It will be appreciated that each tool 16A is freely rotatable relative to the corresponding holders 14 about the respective axis b and, since the two axes b which correspond to each soil working member 3 are in downwardly convergent relationship with each other and with the axis of rotation a of the soil working member 3 concerned, the two tools 16A of each member 3 will tend to revolve about the corresponding axes b in the directions which are indicated by arrows in FIG. 2 of the drawings, it being noted that these directions are opposite to the direction of positively driven rotation of the soil working member 3 of which said two cultivating tools 16A from parts. Each tool 16A attacks the soil at three different vertically spaced apart levels and, due to the inclinations of the elements 23, 24 and 25 to the horizontal, said tools 16A tend to displace the soil which they attack upwardly. The result is that the soil is well crumbled and mixed and this action is enhanced by the considerably overlapping relationship of the successive soil working members 3 along the row thereof. In addition to performing its supporting and depth control functions, the roller 32 which lies behind the members 3 with respect of the direction A performs a gentle levelling and consolidating action upon the soil that has been worked by the members 3 and will tend to crush any stubborn lumps of soil that may remain unbroken at or near the surface thereof, said roller 32 thus also acting as a soil working member in its own right. The cutting edges of the lower soil working elements 26 will tend to cut through the roots of any growing weeds and other unrequired plants so that such plants will usually be killed by the cultivating action of the implement. The free rotatability about the axes b of the tools 16A enables the elements 24, 25 and 26 of those tools to deflect readily to avoid being damaged by embedded stones and the like but, nevertheless, damage to the elements does sometimes occur and, of course, inevitable wear eventually reduces their effectiveness to below an acceptable minimum standard. When one or more of the elements needs to be replaced, the corresponding bolt or bolts 28 is or are temporarily removed whereupon it is only necessary to slide the separate parts of the tool 16A concerned downwardly off the corresponding lower shaft portion 23 and to replace the worn and/or damaged element or elements with fresh elements, the latter being inexpensive to replace because of their very simple formation. It is only then necessary to re-assemble the or each removed tool 16A and to replace and tighten the or each corresponding clamping bolt 28. It has been found that the use of strip-shaped soil working elements that project from opposite sides of the axes b about which they are freely rotatable, said elements being arranged in groups that project form said axes b by progressively decreasing distances, considered downwardly along said groups from top to bottom, considerably reduces the power input that is required to drive the soil working members 3 as compared with, purely for example, soil working members which have rigid and fixed mounted tines.

FIGS. 5 and 6 of the drawings illustrate a soil working member 43 which can be employed in place of the soil working members 3 that have been described above with reference to FIGS. 1 to 4 of the drawings. Each of the members 43, of which one is illustrated in FIGS. 5 and 6 of the drawings, has an internally splined hub 45 which co-operates with the external splines on that portion of a corresponding one of the shafts 2 which projects downwardly from beneath the bottom of the hollow frame portion 1, one of the previously mentioned fastening nuts 12 being employed in the manner described above, preferably in conjunction with a washer, to prevent axial disengagement of the member 43 from its driving shaft 2. Each soil working member 43 comprises a support or carrier 44 which has two straight arms 46 that project radially through equal distances from the opposite sides of the corresponding hub 45 and thus through equal distances from the axis of rotation a of the member 43 concerned. Both arms 46 of each support or carrier 44 are bent over downwardly through 90° at their opposite ends and, immediately beyond the respective bends, said arms 46 are reduced in diameter to form corresponding straight portions 47 whose respective longitudinal axes c are parallel to one another and in coplanar or substantially coplanar relationship with the axis of rotation a of the soil working member 43 of which they form parts. It will be noted from FIGS. 5 and 6 of the drawings that each reduced diameter portion 47 has a circular cross-section whose area is constant throughout the length thereof. Each axis c also affords the axis of free rotatability of a corresponding cultivating tool 48 which is arranged in a freely rotatable manner around the reduced diameter straight portion 47 of the arm 46 concerned. Each tool 48 comprises upper, central or middle and lower soil working elements 24, 25 and 26, respectively, which elements are identical in construction to the corresponding elements that have been described above in connection with the embodiment of FIGS. 1 to 4 of the drawings. Each arm portion 47 is surrounded, at its upper end and close to its lower end, by upper and lower plain bearings 49 and a sleeve 50 that is rotatably supported by said bearings 49 surrounds each shaft portion 47 throughout substantially the whole of the length thereof. As will be evident from the left-hand side of FIG. 5 of the drawings, each sleeve 50 is internally stepped or shouldered for co-operation with the corresponding upper and lower plain bearings 49 and is externally stepped or shouldered to form an upper rim 51 for co-operation with the corresponding upper soil working element 24 and for the formation, at its lower end, of an external screwthread which co-operates with a nut 52 which clampingly engages the lower surface of the corresponding lower soil working element 26. The upper surface of the rim 51 which is formed at the top of each sleeve 50 abuts rotatably against the junction between the upper end of the corresponding arm portion 47 and the thicker remainder of the arm 46 at the lowermost end of the 90° bend therein. Each sleeve 50 has a circular cross-section internal bore which concentrically surrounds the respective arm portion 47 but its external surface is of polygonal cross-section, preferably having the square shape that is illustrated in FIGS. 5 and 6 of the drawings. The previously described elements 24, 25 and 26 are slid upwardly onto the external surface of the sleeve 50, from its lower end, said elements being retained in their appointed spaced apart relationship by spacing sleeves 51A whose internal cross-sectional shapes are the same as the external cross-sectional shape of the sleeve 50 and whose axial lengths are preferably, as illustrated, equal to one another. The assembly of each tool 48 is completed by installing and tightening the corresponding fastening nut 52 that co-operates with a basically circular external step or shoulder at the lower end of the sleeve 50 concerned. Penetration of dirt into the interior of each freely rotatable tool 48 from the lower end thereof is prevented by fitting a cover or cap 53 over the extreme lower end of the arm portion 47 concerned, the rim of said cover or cap 53 fitting inside the otherwise open lower end of the respective sleeve 50 and said cap or cover 53 being removably retained in its appointed position by a pin 54 that is entered transversely through a bore formed very close to the lowermost end of the arm portion 47 under consideration.

In the use of the soil cultivating implement of FIG. 1 of the drawings when equipped with soil working members 43 as described with reference to FIGS. 5 and 6, the members 43 will be positively rotated about the axes a in the same way as described above but the tools 48 will rotate freely about the corresponding axes c in a less regular manner than do the tools 16A about the axes b. This is because the axes c are in substantially parallel relationship with the corresponding axes of rotation a. If the axes of rotation a are vertically, or very nearly vertically, disposed during operation, the axes c will be similarly disposed and not much, if any, mixing of the layers of soil will take place during cultivation. If such mixing is desired, in addition to the crumbling action of the soil working members 43, it can readily be brought about merely by adjusting, in a known manner, the length of the upper lifting link of the threepoint lifting device or hitch of the tractor or other operating vehicle which co-operates with the coupling member or trestle 40 so that, when said coupling member or trestle 40 is connected to the three-point lifting device or hitch, the frame portion 1 of the implement will have been turned angularly through several degrees about its own longitudinal axis with the result that both the axes of positively driven rotation a of the members 43 and the axes of free rotatability c of the tools 48 will be significantly inclined to the vertical. The soil working elements 25, 25 and 26 of the tools 48 will then engage vertically spaced apart layers of soil in directions that are inclined to the horizontal so that more positive rotation of the tools 48 about the axes c will result accompanied by an upward displacing action upon the layers of soil with consequent mixing of those layers as well as crumbling thereof.

Although various features of the soil cultivating implement and the two soil working member embodiments that have been described and/or that are illustrated in the accompanying drawings will be set forth in the following claims as inventive features, it is emphasised that the invention is not necessarily limited to those features and that it includes within its scope each of the parts of the implement and of each soil working member embodiment that has been described, and/or that is illustrated in the accompanying drawings, both individually and in various combination.

What we claim is:

1. A rotary harrow implement comprising a frame and a transverse row of soil working members journalled along the length of an elongated portion of said frame, driving means connected to rotate said members about respective upwardly extending shafts which define the axes of rotation of said members, each member comprising two soil working tools that are diametrically positioned relative to its axis of rotation, the tools on neighboring members being positioned to work overlapping paths, each member comprising substantially horizontal support arm means with opposite end portions and said end portions each mounting freely rotatable tools that depend from said arm means, said tools each comprising superposed elongated flat soil working elements that project outwardly and substantially straight with respect to the axis of tool rotation, said elements extending substantially parallel to a plane perpendicular to said tool axis, the ends of the uppermost flat element being positioned to describe a path adjacent the axis of rotation of a neighboring soil working member, said tool axes being downwardly convergent towards one another and towards the axis of rotation of the respective soil working member.

2. An implement as claimed in claim 1, wherein the axis of rotation of each tool extends between the vertical and horizontal.

3. An implement as claimed in claim 2, wherein the upwardly extending axis of said and the axis of rotation of each tool are substantially coplanar.

4. An implement as claimed in claim 3, wherein said upwardly extending axis and the axis of rotation of each tool of that member converge downwardly.

5. An implement as claimed in claim 1, wherein the axis of rotation of each tool of said soil working member is inclined to said upwardly extending axis at an angle of about 10°.

6. An implement as claimed in claim 1, wherein said elements are relatively fixed to project in different directions.

* * * * *